No. 884,335.
PATENTED APR. 7, 1908.
T. W. KIENAST.
ENVELOP MACHINE.
APPLICATION FILED DEC. 27, 1906.
7 SHEETS—SHEET 1.
Fig.I.
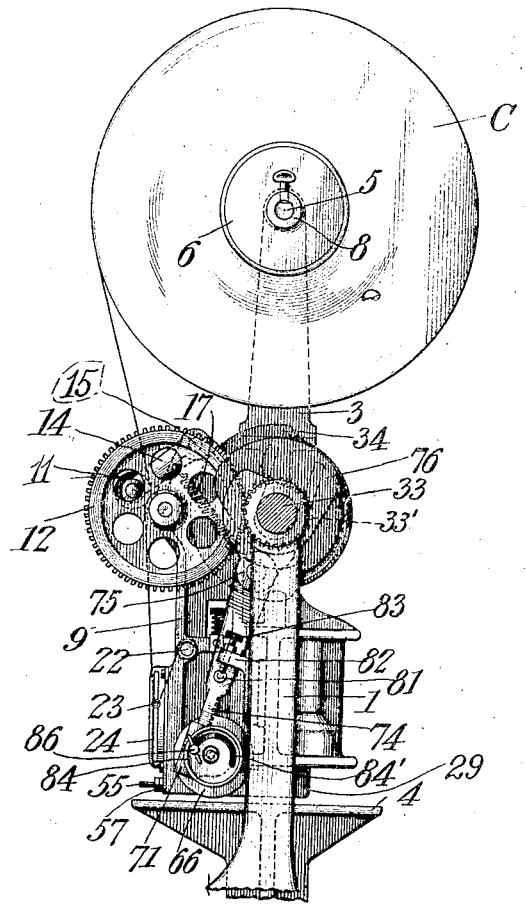
Fig.XVI.
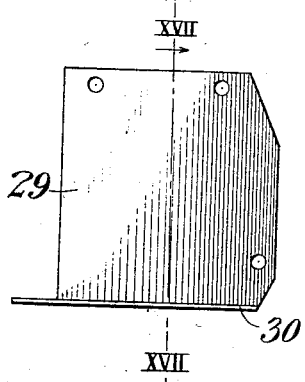
Fig.XVII.
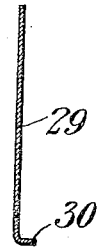
Fig.XVIII.
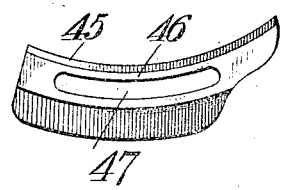
Witnesses.
Fenton S. Belt
Blanche Hogan
Inventor:
T. W. Kienast
By Geo. H. Knight Atty.

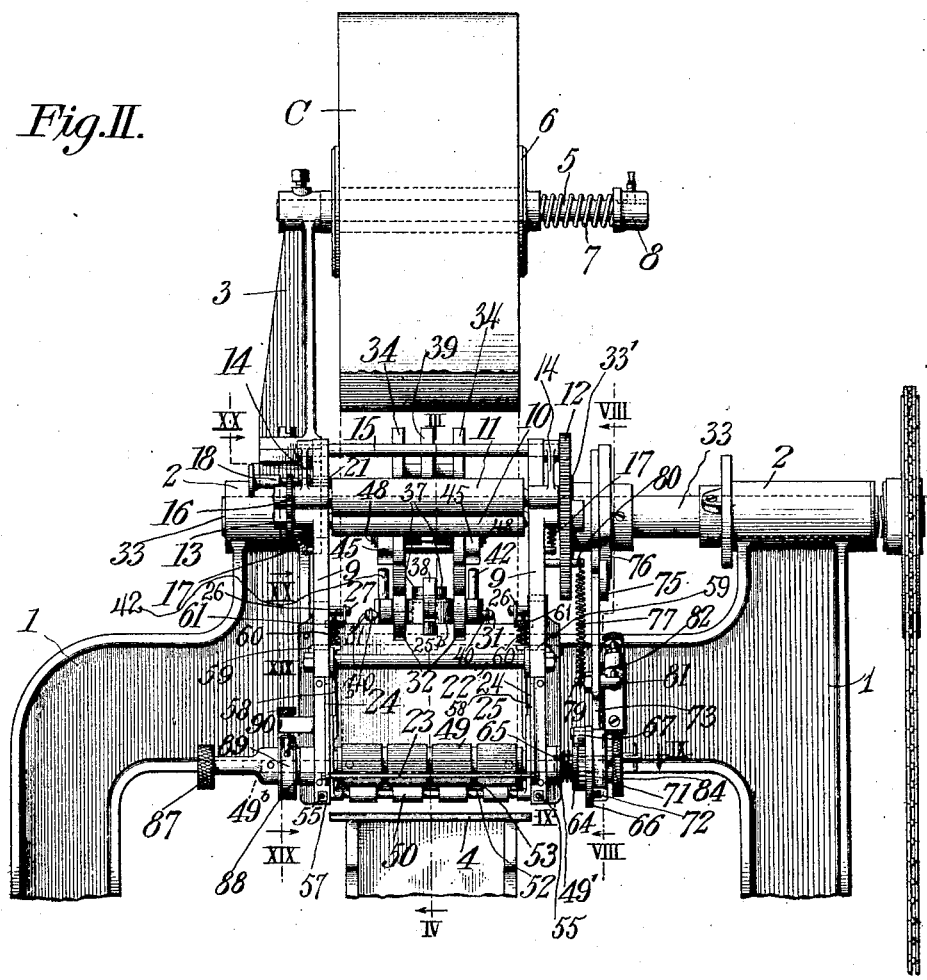
Fig. II.
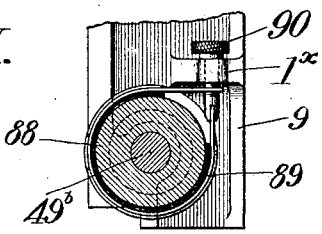
Fig. XIX.

No. 884,335. PATENTED APR. 7, 1908.
T. W. KIENAST.
ENVELOP MACHINE.
APPLICATION FILED DEC. 27, 1906.
7 SHEETS—SHEET 3.
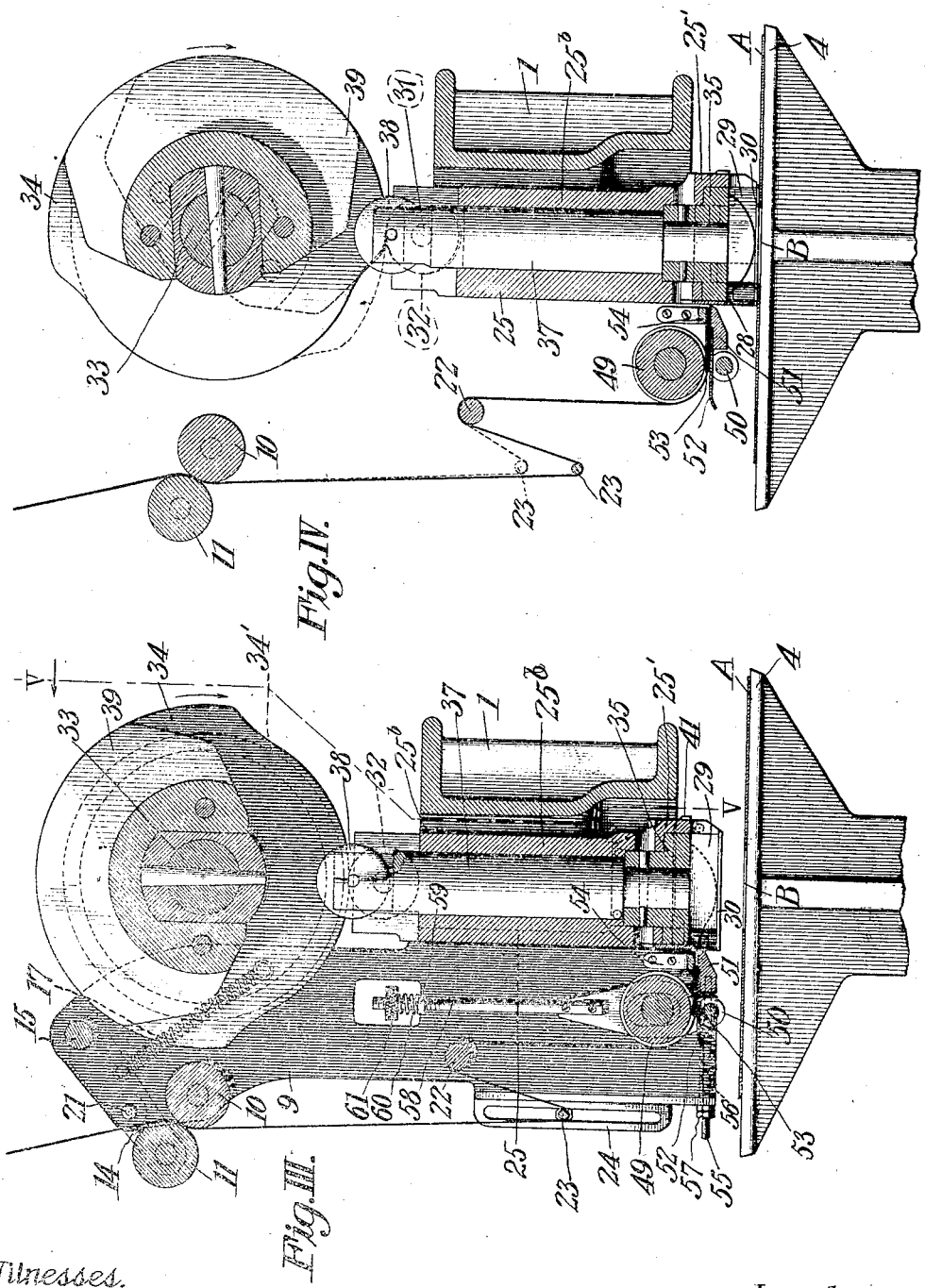
Witnesses.
Fenton S. Belt
Blanche Hogue
Inventor:
T. W. Kienast
By E. Knight Atty.

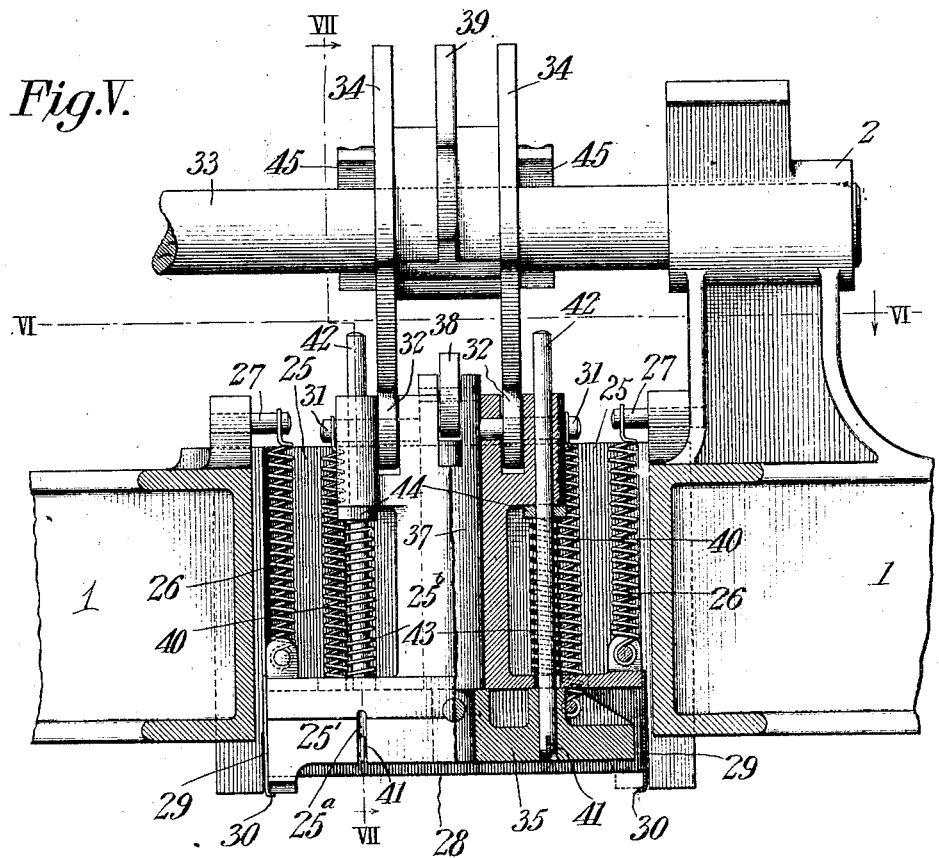
Fig. V.
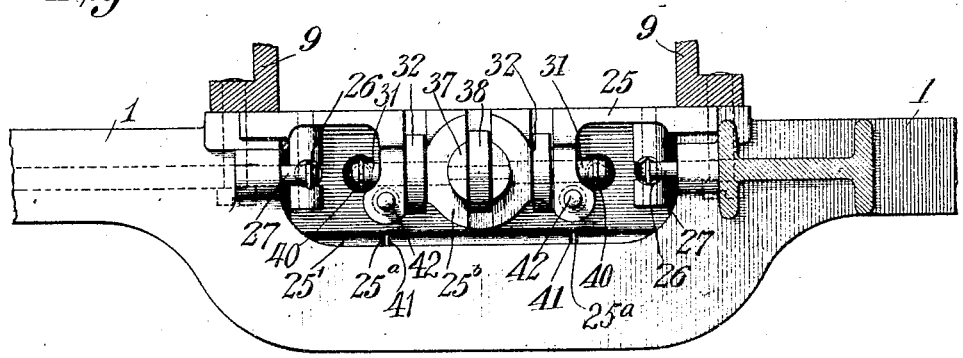
Fig. VI.

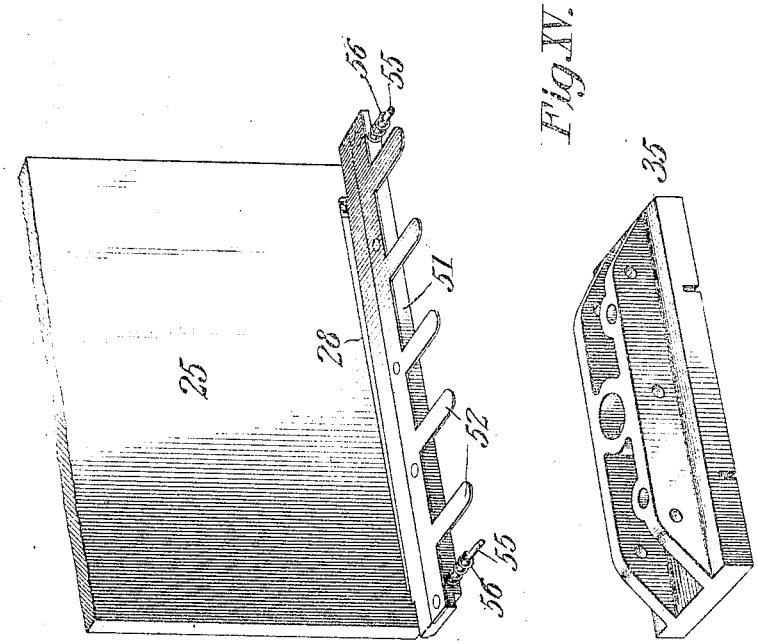
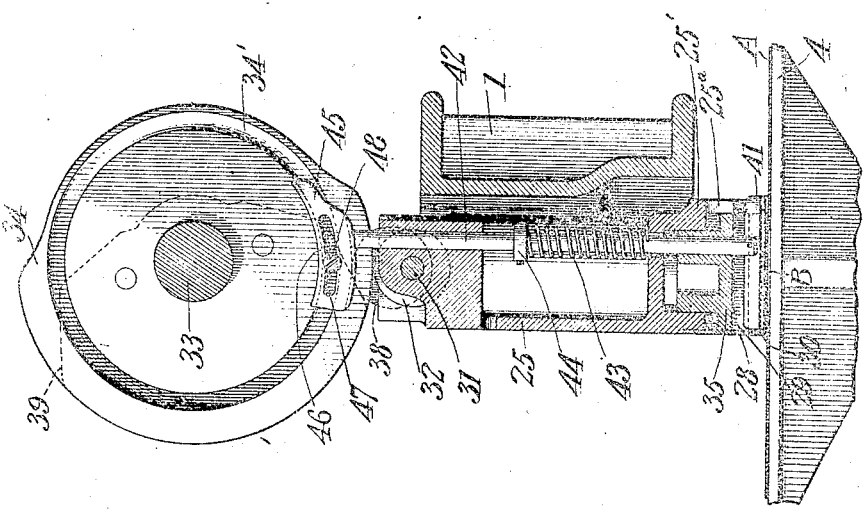

No. 884,335. PATENTED APR. 7, 1908.
T. W. KIENAST.
ENVELOP MACHINE.
APPLICATION FILED DEC. 27, 1906.
7 SHEETS—SHEET 6.
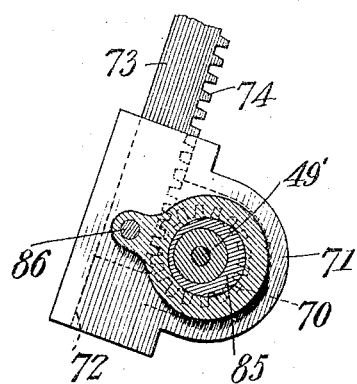
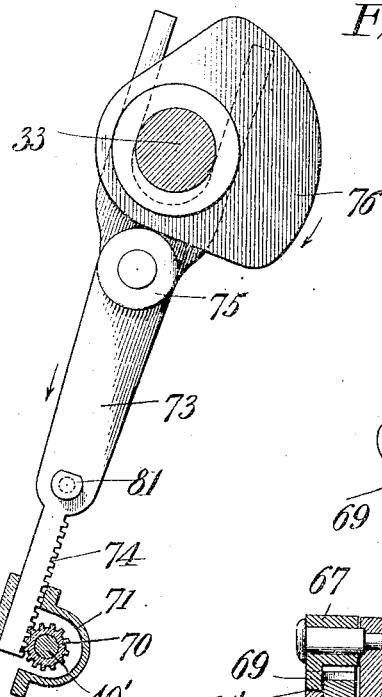
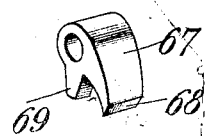
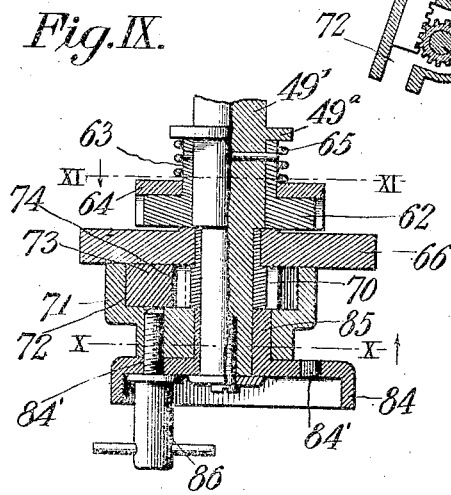
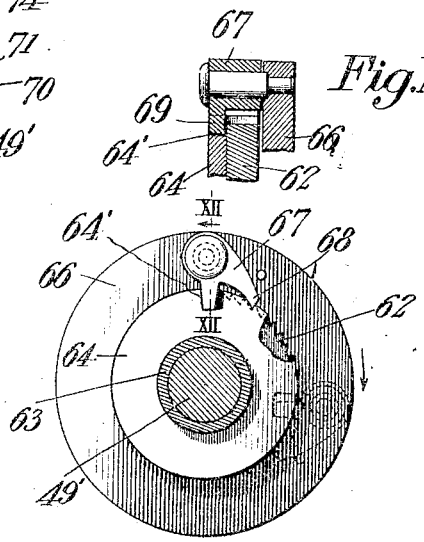
Witnesses.
Inventor:
T. W. Kienast No. 884,335.  
T. W. KIENAST.  
ENVELOP MACHINE.  
APPLICATION FILED DEC. 27, 1906.
PATENTED APR. 7, 1908.
7 SHEETS—SHEET 7.
Fig. XXIII.
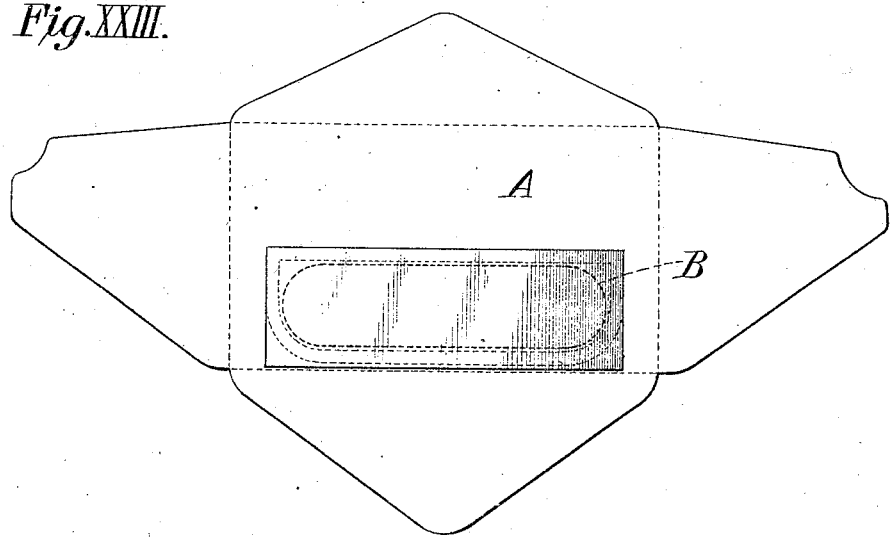
Fig. XXII.
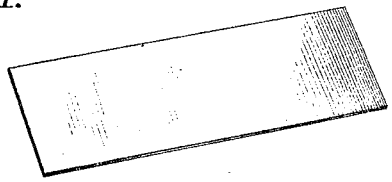
Fig. XXI.
Fig. XX.
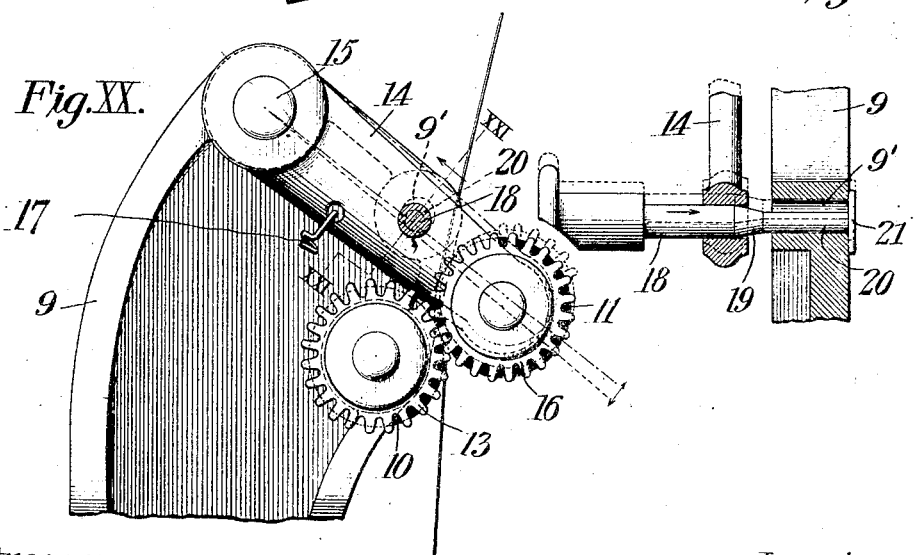
Witnesses.
Fenton S. Belt
Blanche Hogue
Inventor.
T. W. Kienast
By _____ Atty.

UNITED STATES PATENT OFFICE.

THOMAS WILLIAM KIENAST, OF NEW YORK, N. Y., ASSIGNOR TO SAMUEL CUPPLES ENVELOPE COMPANY, OF ST. LOUIS, MISSOURI, A CORPORATION.

ENVELOP-MACHINE.

No. 884,335.  Specification of Letters Patent.  Patented April 7, 1908.

Application filed December 27, 1906. Serial No. 349,618.

*To all whom it may concern:*

Be it known that I, THOMAS WILLIAM KIENAST, a citizen of the United States of America, residing in the city of New York, in the State of New York, have invented certain new and useful Improvements in Envelop-Machines, of which the following is a full, clear, and exact description, reference being had to the accompanying drawing, forming part of this specification.

My invention relates to an improvement in machines for making envelops having incorporated therein a transparent paper strip through which writing upon an inclosure placed within the envelop may be viewed, thereby making the envelop one commonly termed a "self-addressed" envelop.

The present invention pertains to mechanism whereby the transparent paper web is fed, cut into strips of the desired size, and applied to the envelop blanks that are provided with sight openings at the points to which the transparent paper strips are to be applied.

Figure I is a side elevation of my machine. Fig. II is a rear elevation of the machine. Fig. III is an enlarged vertical section taken on line III—IV, Fig. II, with the cutting mechanism and adjacent part of the machine illustrated as they appear just previous to the feeding of the web of transparent paper into position to be cut. Fig. IV is an enlarged vertical section taken on line III—IV, Fig. II, with the cutting mechanism and adjacent parts in the positions assumed after the web of transparent paper has been cut and before the paper strip has been applied to an envelop blank. Fig. V is in part a front elevation of the frame of the machine, the cutting and presser mechanism, and in part a vertical section on line V—V, Fig. III. Fig. VI is an enlarged view illustrating the machine in part in plan and in part in horizontal section taken on line VI—VI, Fig. V. Fig. VII is a vertical section taken on line VII—VII, Fig. V. Fig. VIII is an enlarged vertical section taken on line VIII—VIII, Fig. II, with parts adjacent to said line shown in elevation. Fig. IX is an enlarged horizontal section taken on line IX—IX, Fig. II. Fig. X is a cross section taken on line X—X, Fig. IX. Fig. XI is a cross section taken on line XI—XI, Fig. IX. Fig. XII is a section taken on line XII—XII, Fig. XI. Fig. XIII is a perspective view of the pawl illustrated in Figs. XI and XII. Fig. XIV is an enlarged perspective view of the knife carrying block and paper cutting knives. Fig. XV is an enlarged perspective view of the presser foot that operates upon the strip of transparent paper, after it has been cut and by which said strip of transparent paper is pressed against the envelop blank. Fig. XVI is an enlarged elevation of one of the supporting plates by which the strip of transparent paper is upheld after it has been cut and before it is delivered to the envelop blank. Fig. XVII is a section taken on line XVII—XVII, Fig. XVI. Fig. XVIII is a rear elevation of one of the cams employed for the operation of the restraining feet associated with the presser foot of the machine. Fig. XIX is an enlarged vertical cross section taken on line XIX—XIX, Fig. II. Fig. XX is an enlarged view partly in side elevation and partly in vertical cross section taken on line XX—XX, Fig. II, illustrating the means for supporting and controlling the upper set of paper feeding rollers. Fig. XXI is a cross section taken on line XXI—XXI, Fig. XX. Fig. XXII is a perspective view of one of the transparent paper strips. Fig. XXIII is a plan view of the envelop blank with a transparent paper strip shown applied thereto.

1 designates the main frame of my machine. The machine in its entirety includes means for applying paste to envelop blanks, means for folding and pasting the blanks, and other features of construction which do not form any part of my present invention and therefore are not illustrated. The main frame 1 is provided with journal boxes 2 and surmounted by a post 3 that serve to receive members to be hereinafter more particularly referred to.

4 is a table onto which the envelop blanks A, having sight openings B, are fed in an unfolded condition, and with what is to be the inside of the front of the envelop when folded, uppermost. 5 is a spindle mounted in the post 3 and extending horizontally therefrom. This spindle supports a roll C of transparent paper that is loosely mounted on the spindle and from which the web of transparent paper is fed and cut into strips to be applied to the envelop blanks as will hereinafter appear. The roll of transparent paper is held under a desired degree of restraint to prevent the web of transparent paper from unwinding too rapidly by a disk 6 loosely mounted upon the spindle 3 and backed by an expansion spring 7, that may have any desired degree of tension incorporated therein, by the adjustment of a set collar 8 mounted upon the spindle and against which the outer end of said spring rests.

9 designates a pair of vertically disposed side plates or supporting members secured to the main frame 1 of the machine and extending rearwardly therefrom.

10 and 11 are upper feed rollers supported by said side plates and between which the web of transparent paper drawn from the roll C is fed. The spindles of the feed roller 10 are journaled in the side plates and upon one spindle of the feed roller 10 is a spur wheel 12, while upon the opposite spindle of the feed roller 10 is a spur wheel 13. The feed roller 11 is supported by a pair of hanger arms 14 that are fixed to a rockable cross rod 15 mounted in the upper ends of the side plates 9 whereby said feed roller 11 may be allowed to move toward and away from the periphery of the feed roller 10. Upon a spindle of the feed roller 11, and opposing the spur wheel 13 of the feed roller 10, is a spur wheel 16 arranged to coöperate with said spur wheel 13. To provide for a desired degree of pressure by the feed roller 11 upon the web of transparent paper passing between the feed rollers 10 and 11, I furnish springs 17, one end of each of which is attached to the corresponding hanger arm 14 and the other end to the adjacent side plate 9.

It is desirable to provide means whereby the feed rollers may be in a separated condition when the web of transparent paper is being passed between the feed rollers and carried to the point at which it is to be cut into strips and applied to the envelop blanks, while the machine is at rest (it being understood that it is necessary to perform this act by hand before placing the machine in operation and also necessary to perform it in the event of the web of transparent paper becoming broken.) To provide for this separation of the feed rollers and the holding of the roller 11 away from the other roller 10, I use a lift pin 18 that is loosely fitted in one of the hanger arms 14 and susceptible of sliding therein and provide on the shank of said pin a cone 19 and produce a pin hole 9' in the side plate 9 adjacent to the swinging arm in which the lift pin fits. The shank of the lift pin has an inner reduced end 20 that is of less diameter than the diameter of the pin hole 9' in the side plate 9 and at the termination of its reduced portion is a stop 21 that prevents the withdrawal of the lift pin from said pin hole. When the lift pin is pressed forwardly in the direction indicated by the arrow Fig. XXI, the cone 19 of said pin enters into the pin hole 9', thereby causing the hanger arm 14 in which said pin is located to be lifted, as a result of which the cross rod 15 is rocked and the hanger arm 14 at the other end of said rod is also raised and the feed roller 11 is moved away from the feed roller 10 to a sufficient degree to create a clearance between said feed rollers through which the web of transparent paper delivered from the roll C may be readily passed. When the lift pin is again moved outwardly its cone is removed from the pin hole 9' and the parts are caused to resume their former positions due to the action of the springs 17.

22 designates a guide rod (see Figs. I, II, III and IV) mounted in the side plates 9 and over which the web of transparent paper passes in its course from the feed rollers 10 and 11. In its passage to said guide rod the web of transparent paper passes beneath a floating take-up rod 23 that is loosely mounted in a pair of vertical slotted guides 24 located at the rear of the side plates 9.

25 designates a knife carrying block that is loosely fitted in guideways in the main frame of the machine and preferably held in said guideways by the side plates 9, as seen most clearly in Fig. VI. This knife carrying block is adapted to partake of a vertical movement within the frame of the machine and it is normally upheld by lift springs 26 that are attached at their lower ends to the knife carrying block and at their upper ends to stationary studs 27 projecting over the space in which the knife carrying block operates. Fixed to the knife carrying block, at its rear side, is a knife 28 having a bottom cutting edge and at the front side of said knife carrying block is a wall 25' that is provided with vertical slots 25ª, the said wall being extended downwardly to a greater degree than the said knife as seen most clearly in Figs. III and IV.

29 are paper receiving plates fixed to the ends of the knife carrying block 25 and terminating at their lower ends in inturned horizontal lips 30 (see Figs. III to V inclusive and XVI and XVII), the said plates being of a utility that will be hereinafter specified. The knife carrying block is provided with a vertical post 25ᵇ that terminates at its upper end in a slotted head containing a pair of short shafts 31 on which are loosely mounted rollers 32 that are situated in the slots of the head (see Figs. II, V and VI).

33 is a cam shaft that is journaled in the boxes 2 on the main frame 1. On this cam shaft is a spur wheel 33' that meshes with and drives the spur wheel 12 of the feed roller 10. The cam shaft has fixed to it a pair of cams 34 that are adapted to coöperate with the rollers 32 for the purpose of imparting a downward movement to the knife carrying block 25 against the action of the lift springs 26 connected to said knife carrying block. The cams are of such form that after the desired degree of descent of the knife carrying block is accomplished, they will permit of the knife carrying block being again raised to its former position by the lift springs just mentioned.

35 is a presser foot located beneath the knife carrying block and which occupies a practically box-like cavity within said bottom, due to the existence of the front wall 25' of the knife carrying block, the knife 28 and the paper supporting plates 29. The presser foot 35 is carried by a vertical stem 37 that extends loosely through the post of the knife carrying block and in the upper end of which is loosely fitted a roller 38. This roller is adapted to be engaged by a cam 39 that is carried by the cam shaft 33 in conjunction with the cams 34 thereon and which acts upon engagement with said roller, to impart a downward movement to the stem 37 and the presser foot. It should be here stated, however, that the working face of the cam 39 is so disposed relative to the working faces of the cams 34 that said cams are brought into action at different times as will hereinafter more particularly appear.

40 are lift springs by which the presser foot and its stem are normally held in elevated position and by which said parts are returned to their elevated positions after the cam 39 has acted thereon. These lift springs are connected at their lower ends to the presser foot and their upper ends are preferably connected to the shafts 31 on which the cam receiving rollers 32 are mounted (see Figs. V and VI).

41 designates restraining feet that are loosely seated in the presser foot 35 and extend into the slots 25ª in the front wall of the knife carrying block 25. These restraining feet are carried by rods 42 that extend vertically through the knife carrying block and its head, the rods terminating at their upper ends above said head. The rods 42 and the restraining feet carried thereby are normally upheld by lift springs 43 which surround the rods, rest upon the top of the knife carrying block and bear at their upper ends against collars 44, fixed to said rods.

45 are cam blocks carried by the cams 34 and adapted to coöperate with the upper ends of the rods 42 for the purpose of depressing said rods and the restraining feet against the lifting action of the lift springs 43. The cam blocks 45 are preferably provided with ribs 46 and longitudinal slots 47 (see Fig. XVIII) and are fitted to the cams 34 by the insertion of their ribs into circular grooves 34' in the sides of said cams. Each cam block is adjustably held to the cam 34 to which it is applied by a set screw 48 that passes through the slot in the cam block and into the cam 34. It will be seen that the cam blocks may, as a consequence of the construction just described be readily adjusted relative to the working faces of the cams 34 to position them for action upon the rods 42 at the proper time relative to the action of the cams 34 and the action of the cam 39 associated with the first named cams.

49 designates an upper secondary feed roller and 50 a lower secondary feed roller. This pair of feed rollers are located one above the other adjacent to the knife carrying block 25 and at the rear of said block. Each roller is provided with circumferential grooves as seen most clearly in Fig. II, that receive parts to be presently more particularly referred to.

51 designates a horizontal knife bar, the cutting edge of which is located in opposition to the movable knife 28 on the knife carrying block 25.

52 are lower guide fingers attached to and projecting rearwardly from the knife bar 51 and occupying the circumferential grooves in the lower feed roller 50.

53 are upper guide fingers that surmount the lower guide fingers 52 and occupy the circumferential grooves in the upper feed roller 49. The upper guide fingers are supported by a cross bar 54 that is attached to the side plates 9 immediately above the knife bar 51. The movable knife 28 is adapted to operate in a shearing manner against the cutting edge of the knife bar 51 for which purpose the knife 28 is inclined in an upward direction at its lower and cutting edge, and the knife bar 51 is so formed that its cutting edge will enter at one end of the bar beneath the knife 28 when the knife is elevated, as seen in Fig. XIV. The other end of the knife bar always remains at the rear face of the knife and consequently the cutting edges of these two members are, when cutting action takes place arranged obliquely to each other. For the purpose of securing the desired adjustment of the knife bar 51 relative to the knife 28 said knife bar has attached to it adjustment rods 55 that are mounted in the side plates 9 and surrounded by expansion springs 56. The springs 56 tend to force the knife bar 51 in a direction toward the knife 28 and hold it yieldingly in such position to cause the desired shearing cut, the degree of inward movement of the knife bar being controlled by set nuts 57 on the adjustment rods.

To secure the desired degree of contact between the upper and lower feed rollers 49 and 50, I mount the lower feed roller in the lower ends of supporting bars 58 that are slotted to encircle the spindles of the upper feed roller as shown in dotted lines Fig. III, and the upper ends of which extend through lugs 59 projecting from the side plates 9. On said bars above said lugs are lift springs 60 and nuts 61, as seen most clearly in Fig.

III. This construction provides for the lower feed roller being yieldingly upheld to the upper feed roller.

The lower feed roller 50 operates merely as an idler while the upper feed roller 49 is operated through means that will now be described. Upon a spindle 49' of said roller (see Fig. IX) is an annular rim 49ª.

62 is a ratchet wheel fixed to the spindle 49' and having a sleeve 63 that projects inwardly toward the annular rim on said spindle.

64 is a disk mounted on the sleeve of the ratchet wheel and held in frictional contact with said ratchet wheel by a spring 65. The disk 64 is provided at its edge with a notch 64'.

66 is a pawl carrying disk located alongside of the ratchet wheel 62, and 67 is a pawl carried by said disk and having a point 68 that engages the teeth of said ratchet wheel. The pawl is provided with a finger 69 that seats in the notch in the disk 64 and which has a utility to be mentioned.

70 is a pinion fixed to the spindle 49' and upon an extension of which the disk 66 is rigidly mounted (see Fig. IX).

71 is a housing inclosing the pinion 70 and provided with a runway 72 (see Fig. VIII), offset from said pinion.

73 is a reciprocatory bar by which the pinion 70 is driven, the bar for this purpose being provided at its lower end with a rack 74 that engages the pinion and operates in the runway 72 of the housing 71. The upper end of the bar 73 is bifurcated to straddle the cam shaft 33, and upon the bar is a roller 75 (see Figs. I, II and VIII) that is engaged by a cam 76 carried by said cam shaft. The reciprocatory bar 73 has connected to it a lift spring 77 that serves to maintain the roller 75 in engagement with the cam 76, the said spring being connected at its lower end to the bar at 79 and to a fixed part of the machine at 80.

81 is a stop carried by the reciprocatory bar and projecting into proximity with a lug 82 attached to the main frame of the machine (see Figs. I and II). In this lug is a set screw 83 that opposes the stop 81, the set screw being adapted to be adjusted for the purpose of governing the degree of movement of the reciprocatory bar that carries said stop. Upon the downward movement of the reciprocatory bar its rack 74, coöperating with the pinion 70 acts to impart rotation to said pinion. The pawl carrying disk 66 being fixed to said pinion is rotated therewith and the pawl 67 is caused to coöperate with the ratchet wheel 62, fixed to the feed roller spindle 49', and impart rotation thereto with the result of turning the feed roller 49. Upon each return movement of the reciprocatory bar 73 the pawl carrying disk 66 carries the pawl 67 backwardly in an inactive condition and the feed roller 49 is unaffected during this period. While the movement of the disk 66 and its pawl is taking place the point of the pawl is held out of engagement with the teeth of the ratchet wheel. This result is accomplished through the medium of the disk 64, in the notch 64' of which the finger of the pawl is seated, being held under restraint by the spring 65 bearing against said disk and holding it in frictional contact with the adjacent face of the ratchet wheel 62. The construction just referred to provides for an actuation of the pawl and prevents it from wearing against the ratchet wheel on its return movement and also renders the ratchet and pawl mechanism practically noiseless.

84 designates an adjustment collar that is provided with an eccentric sleeve 85 that surrounds the feed roller spindle 49' and on which the housing 71 that incloses the pinion 70 is mounted. This collar and its eccentric sleeve are utilized for the adjustment of said housing to provide for its runway portion, in which the rack 74 operates, being moved closer to the pinion 70 to overcome lost motion between said parts either initially or after they have become worn. It will be seen that when the collar is turned on the feed roller spindle its eccentric sleeve will act upon the housing to shift it transversely relative to the feed roller spindle. For the purpose of locking the adjustment collar in a set position the head of said collar is provided with a semi-circular slot 84' and a set screw 86 is passed through said slot and seated in the housing 71, whereby the head of said screw is caused to bind against the head of said collar.

The spindle 49ᵇ of the feed roller 49 opposite that to which the feed mechanism is applied bears a finger knob 87 by which the feed roller may be turned by hand in passing the web of transparent paper between the feed rollers 49 and 50 in preparing the machine for service. For the purpose of preventing undue movement of the feed roller 49 I mount upon the spindle 49ᵇ of said roller a brake wheel 88 (see Fig. XIX) and apply to said brake wheel a friction band 89. The friction band is attached to one end to the stem of an adjustment screw 90 mounted in a lug 1ˣ projecting from a fixed part of the machine, and the other end of the band loosely encircles the screw stem. When the adjustment screw is turned in the lug 1ˣ the friction band is either bound more tightly to the brake wheel 88, or loosened on said wheel according to the direction in which the screw is turned, whereby the desired degree of brake action, relative to the feed roller 49, is obtained.

During the practical use of my machine, the upper set of feed rollers, 10 and 11, and the lower set, or secondary set of feed rollers 49 and 50 driven in the manner described, operate upon the web of transparent paper, whereby the paper is gradually fed, between the guide fingers 52 and 53 and across the knife bar 51, during the period that the knife carrying block 25, and the presser foot 35 are in elevated positions. It is to be understood in this connection that the surplus amount of transparent paper that is fed forwardly by the upper feed rollers while the lower feed rollers are inactive, is held taut by the take-up rod 23. The web of paper having been fed across the knife bar 51, while the knife carrying block 25 and presser foot 35 are in elevated position is cut to produce a strip for application to an envelop blank, when the knife carrying block descends from the position seen in Fig. III to the position seen in Fig. IV. The time at which this cutting action takes place is determined by the arrangement and working of the cams 34. The strip of paper cut from the main web, falls as it is cut, onto the lips 30 of the paper receiving plates 29, which serve as supports therefor, for the time being. The presser foot 35 is then forced downwardly due to the coöperation of the cam 39 with the roller carried by the stem of said presser foot and as said presser foot descends, it carries the strip of transparent paper previously severed from the main web to the envelop blank, resting on the table 4. The envelop blank having been previously coated with an adhesive, at the location of the sight opening therein, receives the strip of transparent paper in a manner to cause such strip to adhere thereto when pressure is exerted against it by the presser foot. Then before the presser foot ascends under the action of its lift springs, and before the cam 39 has been removed from engagement with the roller with which it coöperates, the restraining feet 41 are pressed downwardly to the envelop blank, and the strip of transparent paper thereon due to the coöperation of the cam blocks 45 with the upper ends of the rods 42 that carry said restraining feet, whereby said feet are held in engagement with the envelop blank to prevent its upward movement, while the presser foot is ascending. The cam blocks just mentioned then immediately pass out of engagement with the rods 42, allowing the restraining feet to be lifted under the influence of the lift springs 43, surrounding the rods 42. The envelop blank to which the transparent sheet has been applied in the manner stated, is then conducted off the table 4 by suitable means (not shown) thereby leaving the table clear to receive the next blank for the application of a transparent strip of paper to it.

I claim:—

1. In an envelop machine of the character described, the combination of an envelop blank receiving table, means for supporting a web of transparent paper, means for feeding the web to a point above said table, means for receiving and supporting the web and carrying the paper strip, having a knife for cutting the web into strips, and means located within the receiving, supporting and carrying means whereby the strip is dislodged from its support and pressed to an envelop blank resting on said table, substantially as set forth.

2. In an envelop machine of the character described, the combination of an envelop blank receiving table, means for feeding a web of transparent paper into a position above said table, means for receiving and supporting the web and carrying the paper strip having a knife for cutting the web into strips, means located within the receiving, supporting and carrying means for pressing the strips to envelop blanks resting on said table, and means for restraining the envelop blanks from movement while said pressing means is moving away from the blank, substantially as set forth.

3. In an envelop machine of the character described the combination of an envelop blank receiving table, means for supporting a web of transparent paper, primary feed rollers between which said web passes, secondary feed rollers between which said web also passes, means for receiving and supporting the web and carrying the paper strip having a knife for cutting said web into strips after it has passed said secondary feed rollers and means located within the receiving, supporting and carrying means for pressing the strips to an envelop blank resting on said table, substantially as set forth.

4. In an envelop machine of the character described, the combination of an envelop blank receiving table, means for supporting a web of transparent paper, primary feed rollers between which said web passes, secondary feed rollers between which said web also passes, means for receiving and supporting the web and carrying the paper strip having a knife for cutting said web into strips after it has passed said secondary feed rollers, means located within the receiving, supporting and carrying means for pressing the strips of paper to an envelop blank resting on said table, and take-up means for holding said web in a taut condition while it is passing from one set of said feed rollers to the other set of feed rollers, substantially as set forth.

5. In an envelop machine of the character described, the combination of an envelop blank receiving table, a knife carrying block, a knife carried by said knife carrying block, a spring pressed knife bar arranged obliquely to said knife and one end of the cutting edge of which knife bar is adapted to pass to a position beneath said knife, and recede from such position during the cutting action, means for feeding a web of paper to said knife bar and knife to cut it into strips, and means for pressing strips of paper to envelop blanks placed upon said table, substantially as set forth.

6. In an envelop machine of the character described, the combination of an envelop blank receiving table, a knife carrying block, a spring pressed knife carried by said knife carrying block, a knife bar opposing said knife and movable at an angle relative to said knife means for feeding a web of paper to said knife bar and knife to be cut into strips, a presser foot by which the strips of paper are pressed to the envelop blanks placed on said table, and restraining feet for holding the envelop blank depressed, while said presser foot is receding, substantially as set forth.

7. In an envelop machine of the character described, the combination of an envelop blank receiving table, a chambered knife carrying block, a knife carried by said knife carrying block, a spring controlled knife bar opposing said knife, means for feeding a web of paper to said knife bar and knife to be cut into strips, a presser foot operable in said knife carrying block and by which the strips of paper are pressed to the envelop blanks placed on said table, spring controlled restraining feet for holding the envelop blank depressed while said presser foot is receding, and an adjustable cam for operating said restraining feet, substantially as set forth.

T. WILLIAM KIENAST.

In presence of—
EDW. J. MCKEE,
WM. E. HARSUETT.